United States Patent
Peters

(10) Patent No.: US 7,614,700 B2
(45) Date of Patent: Nov. 10, 2009

(54) FITTING FOR A VEHICLE SEAT

(75) Inventor: Christoph Peters, Wermelskirchen (DE)

(73) Assignee: KEIPER GmbH & Co. KG, Kaiserslautern (DE)

( * ) Notice: Subject to any disclaimer, the term of this patent is extended or adjusted under 35 U.S.C. 154(b) by 406 days.

(21) Appl. No.: 11/600,487

(22) Filed: Nov. 15, 2006

(65) Prior Publication Data

US 2007/0137393 A1    Jun. 21, 2007

(30) Foreign Application Priority Data

Nov. 16, 2005  (DE) ................. 10 2005 054 490

(51) Int. Cl.
*B60N 2/235* (2006.01)
(52) U.S. Cl. .................. 297/367; 297/378.12
(58) Field of Classification Search ............ 297/367, 297/378.2
See application file for complete search history.

(56) References Cited

U.S. PATENT DOCUMENTS

| | | | | |
|---|---|---|---|---|
| 5,779,313 | A | * | 7/1998 | Rohee ................. 297/367 |
| 5,984,413 | A | * | 11/1999 | Baloche et al. ........... 297/367 |
| 6,007,153 | A | * | 12/1999 | Benoit et al. ........... 297/378.12 |
| 6,095,608 | A | * | 8/2000 | Ganot et al. ........... 297/367 |
| 6,454,354 | B1 | | 9/2002 | Vossmann et al. |
| 6,669,297 | B2 | * | 12/2003 | Cilliere et al. ........... 297/367 |
| 7,055,906 | B2 | * | 6/2006 | Shinozaki ............ 297/367 |
| 7,100,986 | B2 | * | 9/2006 | Uramichi et al. ............ 297/366 |
| 2002/0096923 | A1 | | 7/2002 | Uramichi |
| 2002/0096925 | A1 | * | 7/2002 | Uramichi ............ 297/367 |

FOREIGN PATENT DOCUMENTS

DE      199 28 148 A1    1/2001
DE      602 02 307 T2    12/2005

OTHER PUBLICATIONS

US 6,648,413, 11/2003, Uramichi (withdrawn)

* cited by examiner

*Primary Examiner*—David Dunn
*Assistant Examiner*—Patrick Lynch
(74) *Attorney, Agent, or Firm*—Womble Carlyle Sandridge & Rice, PLLC

(57) ABSTRACT

In a fitting for a vehicle seat having a first fitting part (7), a second fitting part (8) that can be rotated relative to the first fitting part (7) around an axis (A) for freely swinging a backrest (4), an eccentric (11) that is drivable and is rotatably supported around the axis (A), at least two latches (13) that are driven radially outwardly by the eccentric (11) to lock the fitting (5), a control disc (19) that pulls the latches (13) radially inwardly in order to unlock the fitting (5), and a swing-free control element (21) which, during free swinging of the backrest (4) between at least one use position and one swung-free position, prevents locking of the fitting (5), characterized in that during free swinging of the backrest (4), the second fitting part (8) locks the control disc (19), by way of the swing-free control element (21) so that the latches (13) remain open.

20 Claims, 4 Drawing Sheets

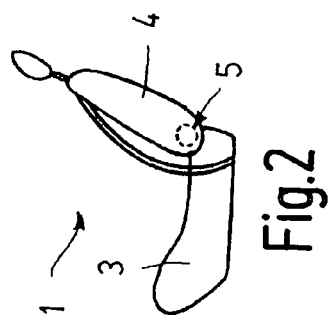
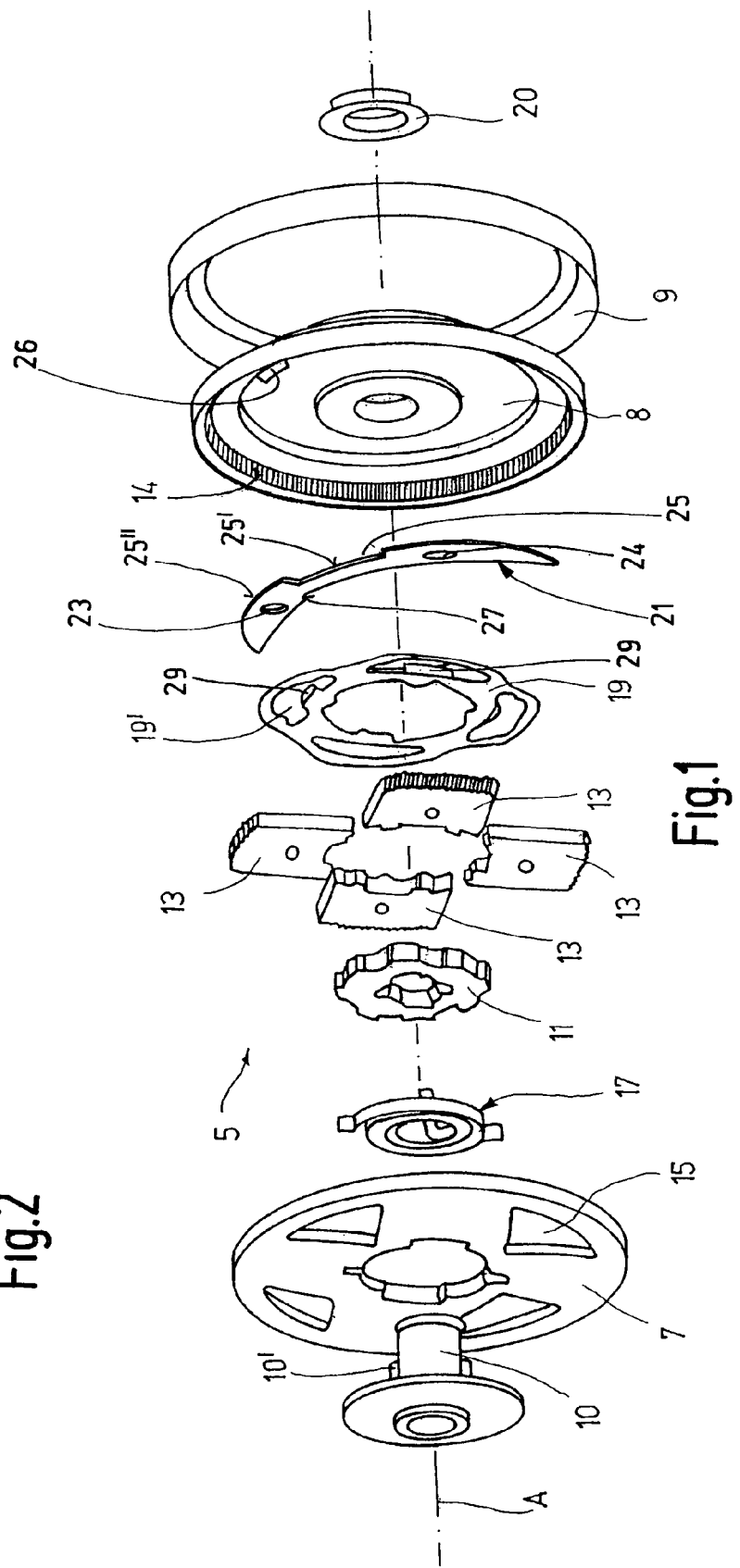

FITTING FOR A VEHICLE SEAT

RELATED APPLICATION

The present invention claims priority to DE 10 2005 054 490.8, which was filed Nov. 16, 2005. The entire disclosure of DE 10 2005 054 490.8 is incorporated herein by reference.

BACKGROUND OF THE INVENTION

The present invention relates to a fitting for a vehicle seat, in particular a motor vehicle seat, having a first fitting part, a second fitting part that can be rotated relative to the first fitting part about an axis for freely swinging a backrest, an eccentric that is supported for being rotated about the axis, at least two latches for being driven radially outwardly by the eccentric into cooperation with the second fitting part in order to lock the fitting, a control disc that pulls the latches radially inward in order to unlock the fitting, and a swing-free control element that prevents locking of the fitting during free swinging of the backrest between at least one use position and one swung-free position.

In a fitting of the type that is described immediately above and is known from DE 199 28 148 A1, which has two latches that are staggered relative to one another by 180°, the swing-free control element has the shape of a ring with a stepped control contour. The control contour controls the way in which the latches, which each have a lug, fall into the different angle areas of the backrest, i.e. it allows locking in the use positions and prevents locking during free swinging and in the swung-free position.

For using such a fitting in a vehicle seat with an integrated seat belt, a higher firmness of the fitting is necessary because of the heavier load, which may be achieved through a larger number of latches. However, the aforementioned solution, with which locking is prevented during free swinging, can only be applied as long as the number of latches, multiplied by the maximum angle area that is traveled over, does not exceed 360°. In the case of four latches, the sum of the setting area of the use positions and the angle area for freely swinging could be 90° at the most in order to allow a definite attribution of the latch to a segment on the control contour.

U.S. Pat. No. 6,648,413 B2 therefore suggests a fitting of the above-mentioned type in which the swing-free control element controls the falling in of exactly one latch which in turn bears upon the eccentric, blocking the eccentric in such a way that the eccentric cannot bear upon the other latches.

BRIEF SUMMARY OF SOME ASPECTS OF THE INVENTION

One aspect of the present invention is the provision of a different feature for unlocking during free swinging (e.g., free pivoting) in a fitting of the same general type as that mentioned above.

In accordance with one embodiment of the present invention, a fitting for a vehicle seat, in particular a motor vehicle seat having a backrest that can swing freely (e.g., pivot freely) at least between a use position and a swung-free position, includes a first fitting part, a second fitting part, at least two latches, an eccentric, a control disc and a swing-free control element. The second fitting part is operatively connected to the first fitting part so that the second fitting part can be freely pivoted about (e.g., at least partially around) an axis relative to the first fitting part at least between a first position and a second position while the fitting is in an unlocked state. The second fitting part is for supporting the backrest in the use position while the second fitting part is in the first position. The second fitting part is for supporting the backrest in the swung-free position while the second fitting part is in the second position. The latches are respectively in radially inner positions while the fitting is in the unlocked state. In contrast, the latches are respectively in radially outer positions while the fitting is in a locked state. The latches cooperate with the second fitting part to restrict rotation of the second fitting part relative to the first fitting part during the locked state. The latches are urged radially outward respectively to the radially outer positions in response to the eccentric being rotated about the axis in a first direction. The control disc is for pulling the latches radially inward respectively to the radially inward positions. The second fitting part is operative, by way of the swing-free control element, for restricting movement of the control disc (e.g., for locking the control disc) so that the control disc restricts the latches from moving radially outwardly respectively to the radially outward positions (e.g., holds the latches open) while the second fitting part is rotated between the first position and the second position, so that the fitting is restricted from transitioning from the unlocked state to the locked state while the second fitting part is rotated between the first position and the second position.

In one example, "freely swinging" (e.g., pivoting freely) means that (in particular in the case of two-door motor vehicles with two rows of seats) the backrest of a front seat is pivoting from a use position forward into a non-use position, in which a rear seat can be entered (e.g., accessed for sitting in). The non-use position is called the swung-free position.

Because the second fitting part, by way of the swing-free control element, blocks the control disc to keep the latches open during free swinging of the backrest, and the control disc is a component which for all practical purposes is provided anyway, all that is needed is just a few small adjustments in order to ensure cooperation with the swing-free control element. One may therefore use the same latches for fittings with and without the swing-free feature, which makes production cheaper. In order to achieve further cost reductions, the interfaces with the swing-free control element—provided on the second fitting part and on the control disc—are in principle also provided for fittings without the swing-free feature.

The swing-free control element is preferably a component which is movably supported between the second fitting part and the control disc, with the swing-free control element for example moving from a radially outer position to a radially inner position and back. When unlocking the fitting, controlling the movement of the swing-free control element can be achieved through the use of one of the latches.

In order to allow cooperation between the second fitting part providing information on the existing angle position, and the swing-free control element, the second fitting part preferably has a control cam or similar indicator which cooperates with a control contour of the swing-free control element. The kinematically reversed arrangement is also possible. The control cam and control contour are preferably shaped in such a way as to act in a radial direction in order to move the swing-free control element and/or to keep it in specified positions.

For the swing-free control element and the control disc to cooperate, the swing-free control element preferably has at least one locking step which cooperates with at least one locking stop on the control disc. For simpler mounting, the locking stops for example are made with identical angle intervals on the control disc in the circumferential direction, even if not all of them are used. The locking step (or the locking stops) is preferably shaped in such a way that it runs obliquely in the radial direction and in the circumferential direction in order to move the swing-free control element to another position once the lock has been released.

Other aspects and advantages of the present invention will become apparent from the following.

BRIEF DESCRIPTION OF THE DRAWINGS

The invention is described in more detail below with reference to an exemplary embodiment that is shown in the drawings, in which:

FIG. 1 is an exploded view of the exemplary embodiment,

FIG. 2 is a schematic representation of a vehicle seat,

DETAILED DESCRIPTION OF EXEMPLARY EMBODIMENT

Figure 3:
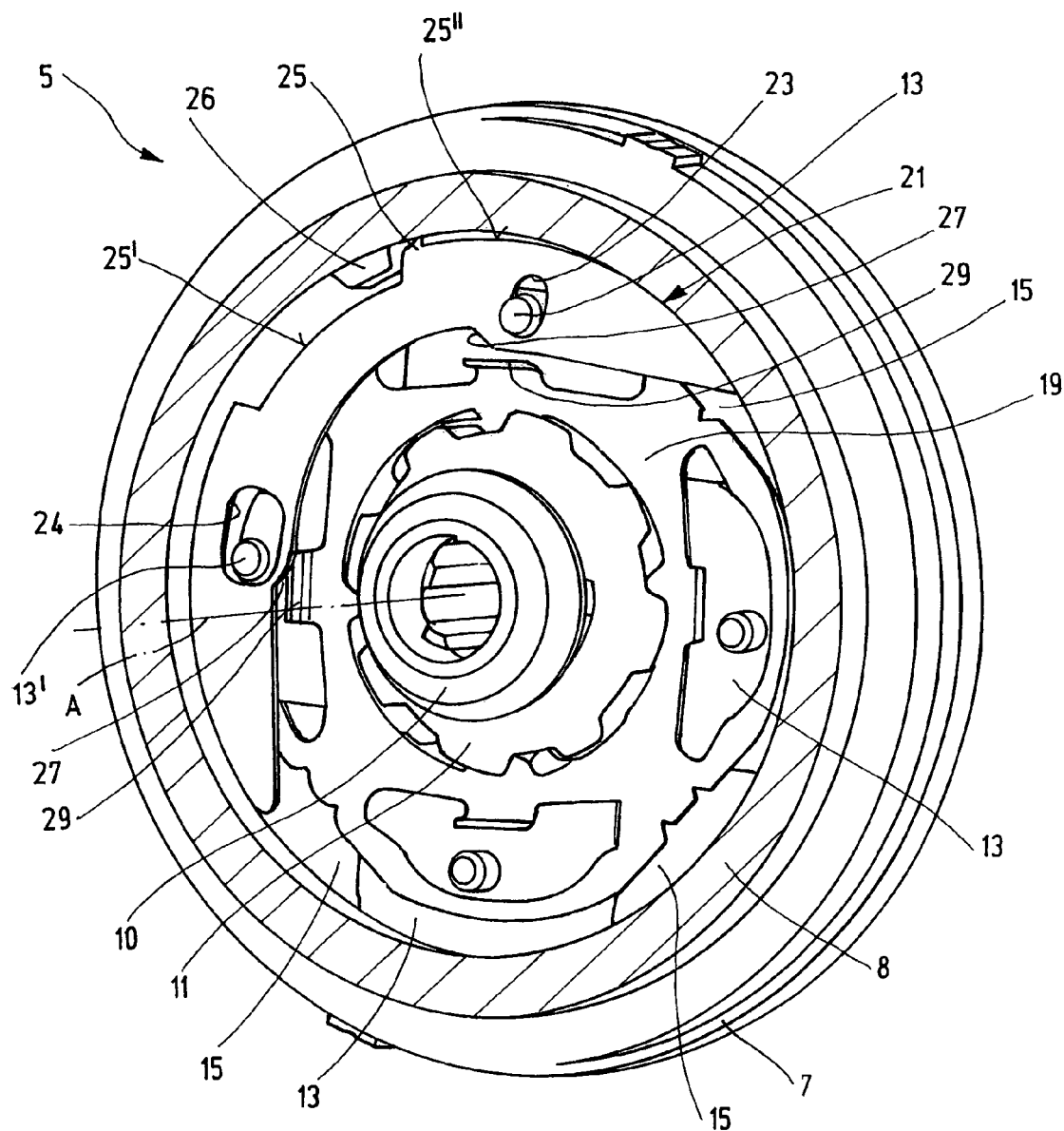
FIG. 3 is a perspective, partially sectioned view of the exemplary embodiment in the locked state.

A vehicle seat 1 of a motor vehicle has a seat part 3 and a backrest 4. The backrest 4 is attached to the seat part 3 by way of two fittings that are respectively positioned at the opposite sides of the vehicle seat 1. The fittings are operative so that the backrest 4 can be pivoted relative to the seat part 3 and locked in different inclination settings. The vehicle seat 1 of the exemplary embodiment has an integrated seat belt, e.g., the upper end of the safety belt is attached to the backrest 4, and even more specifically the upper end of the safety belt is attached to a belt machine that is located at (e.g., mounted to) the upper edge of the backrest 4. For example, the belt machine can be a conventional device that is operative under normal conditions for both reeling in the seat belt and allowing the seat belt to be drawn outwardly therefrom, and that is operative in the invent of (e.g., in response to) a impact (e.g., crash of the motor vehicle) or a relatively high-acceleration maneuver of the motor vehicle for restricting the seat belt from being drawn outwardly therefrom. The forces fed into the backrest 4 via the safety belt in the case of an impact must therefore be diverted to the seat part 3 via the fittings. Therefore, at least the fitting 5 on the side of the vehicle where the load is higher and on which the safety belt is mounted is designed as a maximum load fitting.

The fitting 5 is based on the same principle as the fitting described in DE 199 28 148 A1; therefore, the entire disclosure of DE 199 28 148 A1 is incorporated herein by reference. DE 199 28 148 A1 and U.S. Pat. No. 6,454,354 are members of the same patent family; therefore, the entire disclosure of DE 199 28 148 A1 is incorporated herein by reference. The fitting 5 is in the shape of a lock fitting in disc form. The fitting 5 has a first fitting part 7 and a second fitting part 8 that can be rotated relative to the fitting part 7 around an axis A. A construction space is defined between the first and second fitting parts 7, 8. The axis A defines a cylindrical coordinate system which will be used below. A hoop-like clasping ring 9 reaches over the second fitting part 8 and is connected with the first fitting part 7, whereby the two fitting parts 7 and 8 are axially held together. In the present case, the first fitting part 7 is connected to the seat part 3, and the second fitting part 8 is connected to the backrest 4. The inverse arrangement would also be possible.

A driver 10, which is supported on the second fitting part 8 and can be rotated around the axis A, is arranged in the center of the fitting 5. An eccentric 11 arranged in the construction space sits on the driver 10. More specifically, the eccentric 11 is rotationally fixed on the driver 10, or the eccentric 111 is at least coupled with or otherwise associated with the driver 10 for being caught and then rotated by the driver 10. The eccentric acts 11 on four preferably identical latches 13 which are staggered in the construction space around the eccentric 11 each by 90°. Each of the latches 13 has on its radially outer side (relative to axis A) a toothing allowing it to cooperate with a geared ring 14 of the second fitting part 8 that is in the shape of a hollow wheel. The latches 13 are guided in the radial direction through the guiding segments 15 of the first fitting part 7. The second fitting part 8 rests with the geared ring 14 on the four guiding elements 15, so that the second fitting part 8 is supported on the first fitting part 7.

A spring arrangement 17 of two spiral springs nested inside each other is arranged in a central opening of the first fitting part 7 and bears on the eccentric 11, causing it to push the latches 13 radially outward, i.e. into the geared ring 14, whereby the fitting 5 is locked. This state is shown in FIG. 3. A control disc 19 is arranged in the construction space axially between the latches 13 and the second fitting part 8. In the present case, the control disk 19 is rotationally fixed on the eccentric 11. The control disc 19 has four slotted links 19' (e.g., openings at least partially defined by cam-like edges), each of which cooperates with a nose 13' on a respective latch 13. The noses (e.g., lugs) 13' protrude in the axial direction from the latches 13. When rotating the driver 10- and the eccentric 111 and control disc 19 driven with it—counter to the force of the spring arrangement 17, the control disc 19 pulls the latches 13 radially inward, i.e. out of the gear ring 14, whereby the fitting 5 is unlocked.

The driver 10 is supported by means of a sleeve section in an opening of the second fitting part 8. Two formed-on ribs 10' of the driver 10 bear against the inner side of the second fitting part 8 in the axial direction, whereas a securing ring 20 arranged on the outer side of the second fitting part 8—after being clipped on during assembly of the fitting 5—is firmly connected to the sleeve section of the driver 10. The driver 10 is thereby axially secured.

The fitting 5 allows the inclination of the backrest 4 to be changed between, and set at, various use positions, which includes configurations in which the backrest 4 extends at least generally upright, so that the vehicle seat 1 is suitable for sitting in. The fitting 5 also allows free swinging (e.g., free pivoting) of the backrest 4, during which the backrest 4 can be swung free relative to the seat part 3, so that the backrest 4 can be pivoted forwardly to a forward swung-free position in which the backrest 4 is closer to a horizontal configuration than it was in the forwardmost use position. With the structure of the fitting 5 described so far, the actuation element of the fitting 5 would have to be continuously actuated by the user (active unlocking) during free swinging of the backrest 4, i.e. during pivoting forward from a use position of the backrest 4, in particular the frontmost use position, into a forward swung-free position, in order to maintain the driver 10 and thus the eccentric 11 and the control disc 19 in a rotated position. A swing-free control element 21 is therefore provided in order to increase the user comfort. The swing-free control element 21 is arranged inside the fitting 5 axially between the control disc 19 and the second fitting part 8. The swing-free control element 21 has a basic shape in the form of a crescent and is preferably made of sheet metal. By means of a (at least approximately radially running) long hole 23, the swing-free control element 21 encloses the nose 13' of a (single) latch 13, whereby the swing-free control element 21 is coupled in its angle position in the circumferential direction to the first fitting part 7. The nose 13' of another latch 13 bears radially against the inside of the rim of a rather large recess 24 in the swing-free control element 21 located opposite the long hole 23 and is otherwise loosely enclosed by the recess 24.

On its side facing radially outward, the swing-free control element 21 has a control contour 25 with a section further inside 25' and a section further outside 25" as well as a step between them. For cooperation with the control contour 25, the second fitting part 8 has a control cam 26 which points radially inward and is axially staggered from (e.g., spaced apart from) the geared ring 14. On its side facing radially inward, the swing-free control element 21 has, staggered by 90°, two locking steps 27. Each of the locking steps 27 is arranged between two areas (e.g., edges) of the swing-free control element 21 that are located at different radial distances from the axis A. Regarding the area (e.g., edge) of the swing-free control element 21 that extends between the two locking steps 27, the radial distance between it and the axis A varies (increases or decreases) as a function of its length. The locking steps 27 run obliquely relative to the radial direction and the circumferential direction. For cooperation with the locking steps 27, locking stops 29 that are staggered by 90° are provided on the control disc 19, more precisely at the rim of the slotted links 19', preferably altogether four for simplified mounting, but with only two being relevant. Each locking stop 29 is made by simply bending projections of the control disc 19 axially (e.g., 90°) from the plane of the base part of the control disk. The control disc 19 is preferably made of sheet metal.

In the use positions of the backrest 4, the control cam 26—seen in the circumferential direction—is located in the area of the section 25' of the control contour 25 that is farther radially inward, at a distance from the area of the section 25', and the swing-free control element 21 is arranged according to the radial extension of the long hole 23 in a radially outer position, without having to have any contact with the locking stops 29. The nose 13' enclosed by the long hole 23 is at the radially inner end of the long hole 23.

Figure 4:
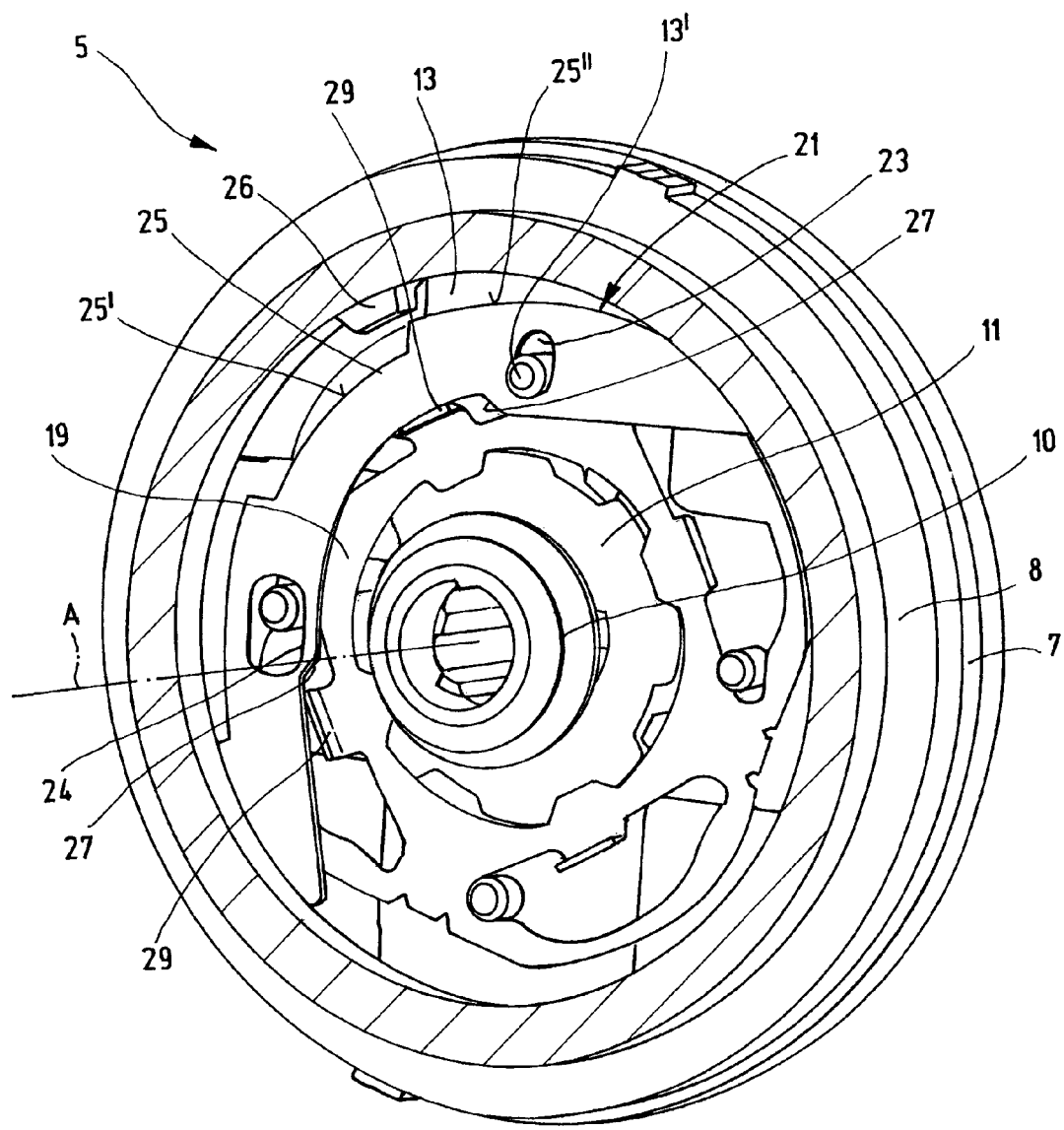
FIG. 4 is a view corresponding to FIG. 3 of the actively unlocked exemplary embodiment before pivoting the second fitting part.

When the fitting 5 is actively unlocked, i.e. by rotating the driver 10, the eccentric 11 and the control disc 19, the latches 13 are pulled radially inward, and the swing-free control element 21 is also moved to and maintained at a radially inner position. This movement and maintaining of the control element 21 is by way of the nose 13' enclosed by the long hole 23 and the nose 13' enclosed by the large recess 24. This state of the control element 21 being maintained at the radially inner position by the nose 13' enclosed by the long hole 23 and the nose 13' enclosed by the large recess 24 is shown in FIG. 4. The locking steps 27 are now at approximately the same radial distance from the axis A as the locking stops 29, however their angles in the circumferential direction differ. When pivoting the backrest 4 forward, i.e. when pivoting the second fitting part 8 forward, the control cam 26 (after passing the frontmost use position) reaches the section 25" of the control contour 25 that is located farther radially outward as compared to the section 25'. The swing-free control element 21, however, is still withdrawn so far that there is a distance between the control cam 26 and the section 25" of the control contour 25 that is farther radially outward.

Figure 5:
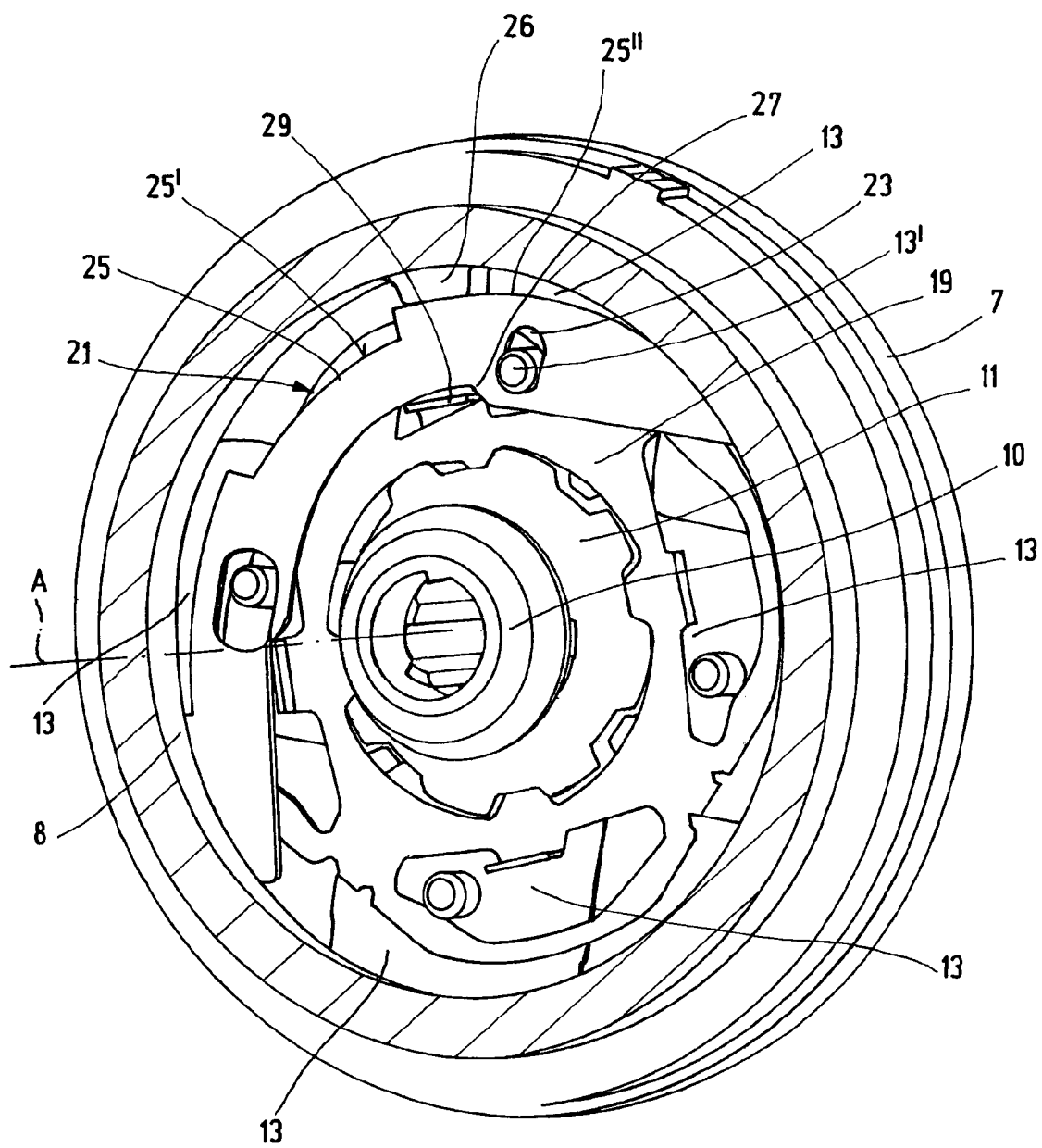
FIG. 5 is a view corresponding to FIG. 3 of the (no longer actively unlocked) exemplary embodiment when pivoting the second fitting part.

Once the active unlocking of the fitting 5 during pivoting forward into the swung-free position is completed, i.e., the actuation element (e.g., handle or hand wheel) of the fitting 5 is released, the spring arrangement 17 turns back the eccentric 11 and the control disc 19. In so doing, the two relevant locking stops 29 come to bear against the locking steps 27. By reason of the inclination of the locking steps 27, the swing-free control element 21 receives a force that is directed radially outward and attempts to move the swing-free control element 21 into its original position. However, the fact that the radially outer section 25" of the control contour 25 bears against the control cam 26 prevents further movement of the swing-free control element 21. The locking steps 27 thus lock the locking stops 29 bearing against them, whereby the control disc 19 is locked. The control disc 19, in turn, on the one hand, maintains these two components in place because of its being rotationally fixed to the eccentric 11 and the driver 10 and, on the other hand, maintains the latches 13 open by means of its slotted links 19'. The fitting 5 remains unlocked, i.e. locking of the fitting 5 is prevented. This state is shown in FIG. 5.

When the backrest 4 is pivoted from the swung-free position back to a use position, the control cam 26 moves along the control contour 25 and thereby advances from the section 25", which extends farther radially outward, to the section 25', which is extends farther radially inward. The control disc 19 driven by the spring arrangement 17 by means of the eccentric 11 can now, initially by the action of its locking stops 29 on the inclined locking steps 27, push the swing-free control element 21 radially outward and then, as rotation continues, pass the locking steps 27. In so doing, the eccentric 11 can push the latches 13 radially outward, thereby locking the fitting 5.

It will be understood by those skilled in the art that while the present invention has been discussed above with reference to an exemplary embodiment, various additions, modifications and changes can be made thereto without departing from the spirit and scope of the invention as set forth in the following claims.

That which is claimed:

1. A fitting for a vehicle seat having a backrest that can swing freely at least between a use position and a swung-free position, the fitting comprising:
   a first fitting part;
   a second fitting part operatively connected to the first fitting part so that the second fitting part can be freely pivoted about an axis relative to the first fitting part at least between a first position and a second position while the fitting is in an unlocked state, wherein the second fitting part is for supporting the backrest in the use position while the second fitting part is in the first position, and the second fitting part is for supporting the backrest in the swung-free position while the second fitting part is in the second position;
   at least two latches for being moved between radially inner positions and radially outer positions, wherein the latches are respectively in the radially inner positions while the fitting is in the unlocked state, the latches are respectively in the radially outer positions while the fitting is in a locked state, and the latches cooperate with the second fitting part to restrict rotation of the second fitting part relative to the first fitting part during the locked state;
   an eccentric for being rotated about the axis, wherein the latches are urged radially outwardly respectively to the radially outer positions in response to the eccentric being rotated in a first direction;
   a control disc for pulling the latches radially inwardly respectively to the radially inward positions; and
   a swing-free control element, wherein the second fitting part is operative, by way of the swing-free control element, for restricting movement of the control disc so that the control disc restricts the latches from moving radially outwardly respectively to the radially outward positions while the second fitting part is rotated between the first position and the second position, so that the fitting is restricted from transitioning to the locked state while the second fitting part is rotated between the first position and the second position, and wherein at least one locking step of the swing-free control element cooperates with at least one locking stop of the control disc to restrict movement of the control disc while the second fitting part is rotated between the first position and the second position.

2. The fitting according to claim 1, wherein at least one of the latches is cooperative with the swing-free control element for moving the swing-free control element from a radially outer position to a radially inner position in response to the fitting being transitioned from the locked state to the unlocked state.

3. The fitting according to claim 1, wherein:
the second fitting part includes a control cam,
the swing-free control element includes a control contour, and
the control cam of the second fitting part cooperates with the control contour of the swing-free control element while the second fitting part is rotated between the first position and the second position.

4. The fitting according to claim 3, wherein:
the control cam protrudes radially inward,
the control contour has sections, and
one of the sections of the control contour extends farther radially outward than another of the sections of the control contour.

5. The fitting according to claim 2, wherein:
the second fitting part includes an inwardly protruding control cam,
the swing-free control element includes a control contour,
the control contour has sections,
one of the sections of the control contour extends farther radially outward than another of the sections of the control contour, and
the control cam cooperates with the farther radially outward section of the control contour to maintaining the swing-free control element in the radially inner position while the second fitting part is rotated between the first position and the second position.

6. The fitting according to claim 1, wherein:
the swing-free control element includes two areas that are located at different radial distances from the axis; and
the locking step extends, radially, circumferentially and obliquely between said two areas that are located the different radial distances.

7. The fitting according to claim 1, wherein the swing-free control element is arranged axially between the second fitting part and the control disc, and an angle is defined between the locking stop and a base of the control disc, so that the locking stop extends axially.

8. The fitting according to any of claim 2, wherein the swing-free control element is in the radially inner position and restricts movement of the control disc while the second fitting part is rotated between the first position and the second position.

9. The fitting according to claim 1 in combination with at least the vehicle seat, with the vehicle seat having a seat part that is attached to the backrest by way of at least the fitting, so that the backrest can be pivoted relative to the seat part and locked at a plurality of inclination settings.

10. The fitting according to claim 2, wherein:
the second fitting part includes a control cam,
the swing-free control element includes a control contour, and
the control cam of the second fitting part slides along the control contour of the swing-free control element while the second fitting part is rotated between the first position and the second position.

11. The fitting according to claim 10, wherein:
the control cam protrudes radially inward,
the control contour has sections, and
one of the sections of the control contour extends farther radially outward than another of the sections of the control contour.

12. The fitting according to claim 2, wherein:
the swing-free control element includes two areas that are located at different radial distances from the axis; and
the locking step extends, radially, circumferentially and obliquely between said two areas that are located the different radial distances.

13. The fitting according to claim 3, wherein the at least one locking step of the swing-free control element engages the at least one locking stop of the control disc to restrict movement of the control disc while the second fitting part is rotated between the first position and the second position.

14. The fitting according to claim 9, wherein there is sliding contact between the second fitting part and the swing-free control element to restrict the swing-free control element from moving out of the radially inner position while the second fitting part is rotated between the first position and the second position.

15. The fitting according to claim 2, wherein the swing-free control element is in the radially inner position and restricts movement of the control disc while the second fitting part is rotated between the first position and the second position.

16. The fitting according to claim 1, wherein:
the swing-free control element is mounted for moving relative to the second fitting part; and
at least one of the latches is cooperative with the swing-free control element for moving the swing-free control element relative to the second fitting part, from a radially outer position to a radially inner position in response to the fitting being transitioned from the locked state to the unlocked state.

17. A fitting for a vehicle seat having a backrest that can swing freely at least between a use position and a swung-free position, the fitting comprising:
a first fitting part;
a second fitting part operatively connected to the first fitting part so that the second fitting part can be freely pivoted about an axis relative to the first fitting part at least between a first position and a second position while the fitting is in an unlocked state, wherein the second fitting part is for supporting the backrest in the use position while the second fitting part is in the first position, and the second fitting part is for supporting the backrest in the swung-free position while the second fitting part is in the second position;
at least two latches for being moved between radially inner positions and radially outer positions, wherein the latches are respectively in the radially inner positions while the fitting is in the unlocked state, the latches are respectively in the radially outer positions while the fitting is in a locked state, and the latches cooperate with the second fitting part to restrict rotation of the second fitting part relative to the first fitting part during the locked state;
an eccentric for being rotated about the axis, wherein the latches are urged radially outwardly respectively to the radially outer positions in response to the eccentric being rotated in a first direction;
a control disc for pulling the latches radially inwardly respectively to the radially inward positions; and
a swing-free control element, wherein the second fitting part is operative, by way of the swing-free control element, for restricting movement of the control disc so that the control disc restricts the latches from moving radially outwardly respectively to the radially outward positions while the second fitting part is rotated between the first position and the second position, so that the fitting is restricted from transitioning to the locked state while the second fitting part is rotated between the first position and the second position, and wherein while the second fitting part is rotated between the first position and the second position
  a control cam of the second fitting part slides along a control contour of the swing-free control element, and
  at least one locking step of the swing-free control element engages at least one locking stop of the control disc.

18. A fitting for a vehicle seat having a backrest that can swing freely at least between a use position and a swung-free position, the fitting comprising:
a first fitting part;
a second fitting part operatively connected to the first fitting part so that the second fitting part can be freely pivoted about an axis relative to the first fitting part at least between a first position and a second position while the fitting is in an unlocked state, wherein the second fitting part is for supporting the backrest in the use position while the second fitting part is in the first position, and the second fitting part is for supporting the backrest in the swung-free position while the second fitting part is in the second position;
at least two latches for being moved between radially inner positions and radially outer positions, wherein the latches are respectively in the radially inner positions while the fitting is in the unlocked state, the latches are respectively in the radially outer positions while the fitting is in a locked state, and the latches cooperate with the second fitting part to restrict rotation of the second fitting part relative to the first fitting part during the locked state;
an eccentric for being rotated about the axis, wherein the latches are urged radially outwardly respectively to the radially outer positions in response to the eccentric being rotated in a first direction;
a control disc for pulling the latches radially inwardly respectively to the radially inward positions; and
a swing-free control element mounted for moving relative to the second fitting part, wherein
at least one of the latches is cooperative with the swing-free control element for moving the swing-free control element from a radially outer position to a radially inner position in response to the fitting being transitioned from the locked state to the unlocked state, and
the second fitting part cooperates with the swing-free control element so that the swing-free control element is in the radially inner position and at least one locking step of the swing-free control element cooperates with at least one locking stop of the control disc to restrict movement of the control disc while the second fitting part is rotated between the first position and the second position, so that the control disc restricts the latches from moving radially outwardly respectively to the radially outward positions while the second fitting part is rotated between the first position and the second position, so that the fitting is restricted from transitioning to the locked state while the second fitting part is rotated between the first position and the second position.

19. The fitting according to claim 1, wherein:
the swing-free control element is positioned
  inside the fitting, and
  axially between the control disc and the second fitting part;
at least one of the latches is cooperative with the swing-free control element for moving the swing-free control element relative to the second fitting part from a radially outer position to a radially inner position in response to the fitting being transitioned from the locked state to the unlocked state;
the second fitting part includes an inwardly protruding control cam;
the swing-free control element includes a control contour;
the control contour has sections;
one of the sections of the control contour extends farther radially outward than another of the sections of the control contour; and
the control cam cooperates with the farther radially outward section of the control contour to maintaining the swing-free control element in the radially inner position while the second fitting part is rotated between the first position and the second position.

20. The fitting according to claim 17, wherein the at least one locking step of the swing-free control element engages the at least one locking stop of the control disc to restrict movement of the control disc while the second fitting part is rotated between the first position and the second position.

\* \* \* \* \*